US008264947B1

(12) United States Patent
Tavares

(10) Patent No.: US 8,264,947 B1
(45) Date of Patent: Sep. 11, 2012

(54) FAULT TOLERANT WIRELESS ACCESS SYSTEM AND METHOD

(75) Inventor: Jason William Tavares, Morristown, NJ (US)

(73) Assignee: Barclays Capital, Inc., New York, NY (US)

(*) Notice: Subject to any disclaimer, the term of this patent is extended or adjusted under 35 U.S.C. 154(b) by 662 days.

(21) Appl. No.: 11/453,411

(22) Filed: Jun. 15, 2006

Related U.S. Application Data

(60) Provisional application No. 60/691,344, filed on Jun. 15, 2005.

(51) Int. Cl.
*H04L 12/26* (2006.01)
(52) U.S. Cl. .................... 370/216; 370/225
(58) Field of Classification Search .......... 370/395, 370/419, 232, 218, 352, 217, 254, 219, 216; 709/221, 224, 220; 726/12
See application file for complete search history.

(56) References Cited

U.S. PATENT DOCUMENTS

| | | | | |
|---|---|---|---|---|
| 6,954,436 B1 * | 10/2005 | Yip et al. | | 370/254 |
| 6,973,027 B1 * | 12/2005 | Shaffer et al. | | 370/218 |
| 7,424,526 B1 * | 9/2008 | Hansen et al. | | 709/224 |
| 7,599,283 B1 * | 10/2009 | Varier et al. | | 370/216 |
| 2002/0165944 A1 * | 11/2002 | Wisner et al. | | 709/220 |
| 2003/0048746 A1 * | 3/2003 | Guess et al. | | 370/219 |
| 2003/0061319 A1 * | 3/2003 | Manzardo | | 709/221 |
| 2004/0037219 A1 * | 2/2004 | Shaffer et al. | | 370/217 |
| 2004/0076160 A1 * | 4/2004 | Phaltankar | | 370/395.1 |
| 2006/0212934 A1 * | 9/2006 | Cameron et al. | | 726/12 |

OTHER PUBLICATIONS

"Case Study Cisco Guest Wireless Hotspots," Cisco Systems, Inc., San Jose, CA, 2004.

* cited by examiner

*Primary Examiner* — Andrew Lai
*Assistant Examiner* — Syed M Bokhari
(74) *Attorney, Agent, or Firm* — Morgan, Lewis & Bockius LLP

(57) ABSTRACT

A fault tolerant wireless system and method is disclosed that provides redundancy against a data center failure. Wireless connections are routed to a switch at a primary data center and forwarded through a gateway router, also located at the primary data center, to the internet. A backup switch and backup gateway router provides redundancy and are located at a backup data center geographically separate from the primary data center. The backup switch and backup gateway router provides an alternate path to the internet if the primary path fails. Both the primary switch and backup switch are assigned to the same subnet but the backup switch is advertised with an offset to favor routes through the primary switch.

9 Claims, 2 Drawing Sheets

FAULT TOLERANT WIRELESS ACCESS SYSTEM AND METHOD

CROSS-REFERENCE TO RELATED APPLICATIONS

This application claims the benefit of prior filed provisional Patent Application No. 60/691,344, filed Jun. 15, 2005, which is incorporated herein by reference.

BACKGROUND OF THE INVENTION

The present invention relates to communication networks. More specifically, the invention relates to fault tolerant wireless networks.

Many companies, both large and small, offer guest internet access through the company's network. This allows visitors to conveniently access their own company's network through the internet. Guest wireless internet access provides greater convenience by allowing the visitor to access the internet without the bother of physically connecting to the company's network.

Allowing non-employees access to a company's network, however, creates a security risk because the guest access may be used as an entry point into the company's network. Furthermore, guest internet access is usually viewed as a non-critical system that does not require the redundant failover systems associated with the company's "critical" computer systems. Therefore, there remains a need for a fault tolerant wireless access system.

SUMMARY OF THE INVENTION

A fault tolerant wireless system and method is disclosed that provides redundancy against a data center failure. Wireless connections are routed to a switch at a primary data center and forwarded through a gateway router, also located at the primary data center, to the internet. A secondary switch and secondary gateway router provides redundancy and are located at a secondary data center geographically separate from the primary data center. The secondary switch and secondary gateway router provides an alternate route to the internet if the primary route fails. Both the primary switch and secondary switch are assigned to the same subnet but the secondary switch is advertised with an offset to favor routes through the primary switch.

One embodiment of the present invention is directed to system comprising: a primary route for handling wireless traffic between an internet and an intranet, the primary route including a primary gateway router connected to the internet and a primary switch configured to aggregate and direct wireless traffic on the intranet, the primary gateway router and primary switch located at a first data center; and a secondary route providing a redundant route between the internet and the intranet, the secondary route including a secondary gateway router connected to the internet and a secondary switch configured to aggregate and direct wireless traffic on the intranet, the secondary gateway router and secondary switch located at a second data center geographically separate from the first data center, wherein the primary switch and secondary switch are on a same subnet and exchange keep-alive messages with each other. In one aspect, the system further comprises an access manager connected between the primary gateway router and the primary switch, the access manager allowing access to the internet to only an authorized guest. In another aspect, the primary gateway router and primary switch maintain communication with each other using a routing protocol, the primary switch automatically routing the wireless traffic to the secondary switch when communication between the primary gateway router and the primary switch is broken. In another aspect, the primary switch advertises an IP address with a first offset and the secondary switch advertises the same IP address with a second offset, the first and second offsets selected to route wireless traffic to the primary switch.

Another embodiment of the present invention is directed to a method of providing fault tolerant wireless access to an internet, the method comprising: providing a primary switch located at a first data center, the primary switch configured to route wireless traffic to the internet through a first route; and providing a secondary switch located at a second data center separate from the first data center, the secondary switch configured to route wireless traffic to the internet through a second route when a break occurs in the first route.

Another embodiment of the present invention is directed to a method of wirelessly accessing an internet at a site, the method comprising: receiving an access code; connecting to a wireless network using the access code, the wireless network connected to the internet; and transmitting messages to the internet, the messages routed through a primary wireless switch located at a primary data center, the primary wireless switch routing the messages to the internet along a primary route, wherein a secondary wireless switch located at a secondary data center separate from the first data center automatically routes the messages through a secondary route when a break occurs in the primary route.

BRIEF DESCRIPTION OF THE DRAWINGS

The invention will be described by reference to the preferred and alternative embodiments thereof in conjunction with the drawings in which.

DETAILED DESCRIPTION

Figure 1:
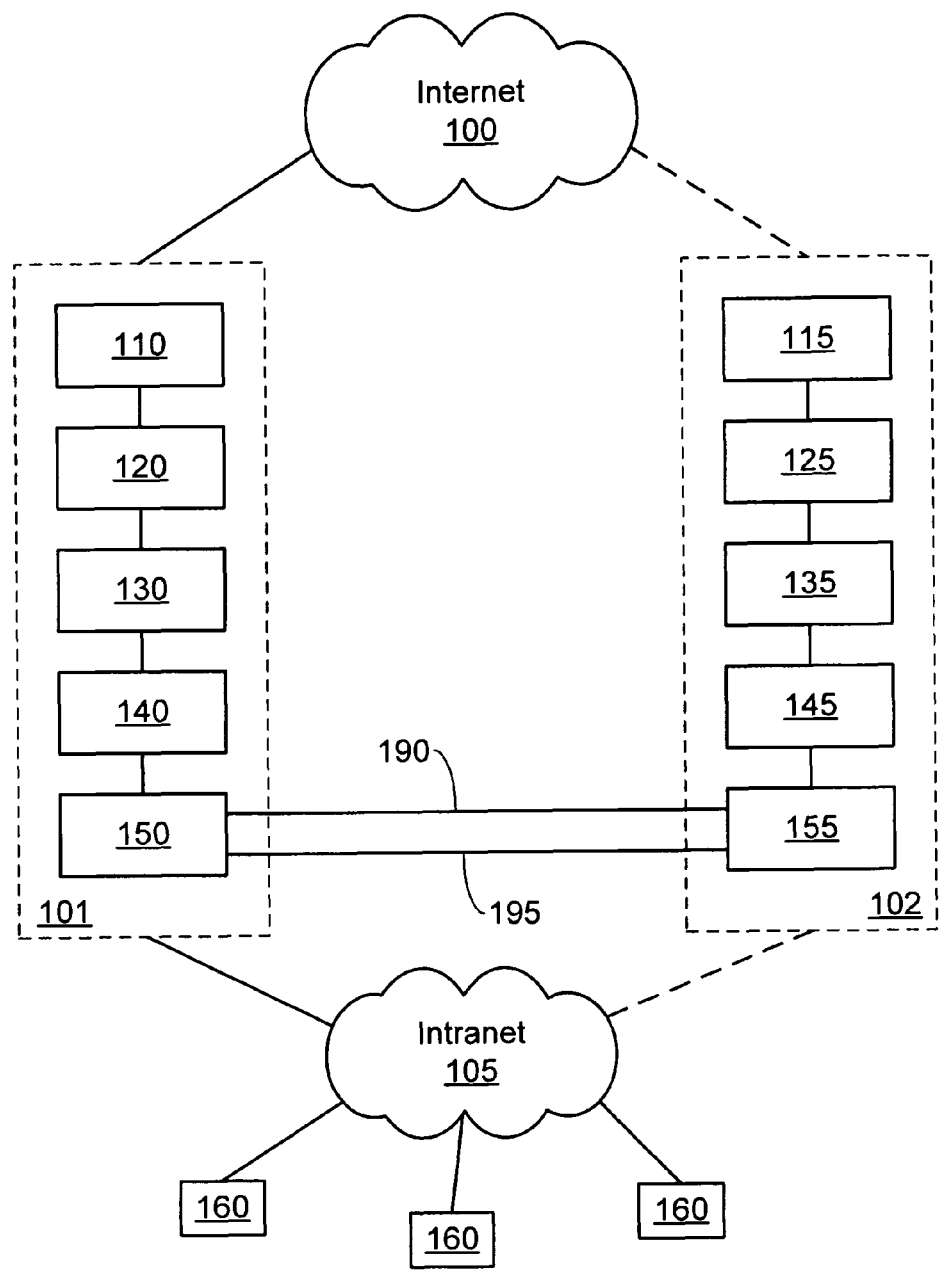
FIG. 1 is a diagram illustrating an embodiment of the present invention.

FIG. 1 is a diagram illustrating an embodiment of the present invention. In FIG. 1, a primary path through a primary data center 101 connects a company's intranet 105 to the internet 100. An alternate path to the internet 100 is provided at a secondary data center 102 that is preferably geographically separated from the primary data center 101 to provide failover redundancy at the data center level.

Each data center 101 102 includes a gateway router 110 115 that connects to the internet 100. Gateway router is connected to the company's external firewall 120 125. An access manager 130 135 sits in the company's DMZ between the external firewall 120 125 and an internal firewall 140 145. The access manager 130 135 controls access to the Internet for outgoing packets. In the primary data center 101, a primary switch 150 is connected between the internal firewall 140 and the company's intranet 105. At the secondary data center 102, a secondary switch 155 is connected between the secondary data center's internal firewall 145 and the company's intranet 105.

An access point 160 allows local wireless access to the internet 100. In FIG. 1, several access points 160 are preferably distributed throughout the company's premises to provide sufficient wireless coverage from anywhere within the company. Each access point routes the received wireless messages to the primary switch 150 but can route the messages to the secondary switch, shown as a dashed line in FIG. 1, if the primary switch fails.

The primary and secondary switches communicate with each other via a redundancy subnet 190 and a utility subnet 195. The redundancy subnet carries the wireless traffic between the primary and secondary switches. The utility subnet carries status and administrative information exchanged between the two switches.

In a preferred embodiment, a keep-alive message is repeatedly exchanged between the switches at a predetermined time interval. The keep-alive message allows each switch to monitor the status of the other switch and take an appropriate action when the required. For example, if the primary switch fails, the secondary switch will experience a break in the keep-alive exchange and can take the appropriate action.

The gateway router 110 and primary switch 150 can monitor the route between them by exchanging messages with each other using a routing protocol such as, for example, border gateway protocol (BGP) or other common protocols used in the art. Usually, firewalls 120 140 and the access manager 130 are not configured to communicate with each other using BGP so the status of the route to the internet cannot be easily determined. The gateway router and primary switch, however, communicate with each other using BGP and a failure of the firewall or access manager breaks the communication between the gateway router and primary switch. If such a break occurs, the primary switch can reroute the internet-bound packets to the secondary switch through the redundancy subnet 190. The failover to the redundancy subnet is expected to be fast as each switch maintains a list of alternate next-hop devices for internet-bound traffic and can quickly redirect internet-bound traffic to the secondary switch if a break between the gateway router 110 and primary switch 150 is detected.

At the secondary data center, gateway router 115, external firewall 125, access manager 135, internal firewall 145, and secondary switch 155 provide an alternate route for internet-bound wireless messages and provide device-level redundancy for the system. Monitoring of the alternate route to the internet between the secondary switch 155 and gateway router 115 may follow the same method as described for the primary route.

Figure 2:
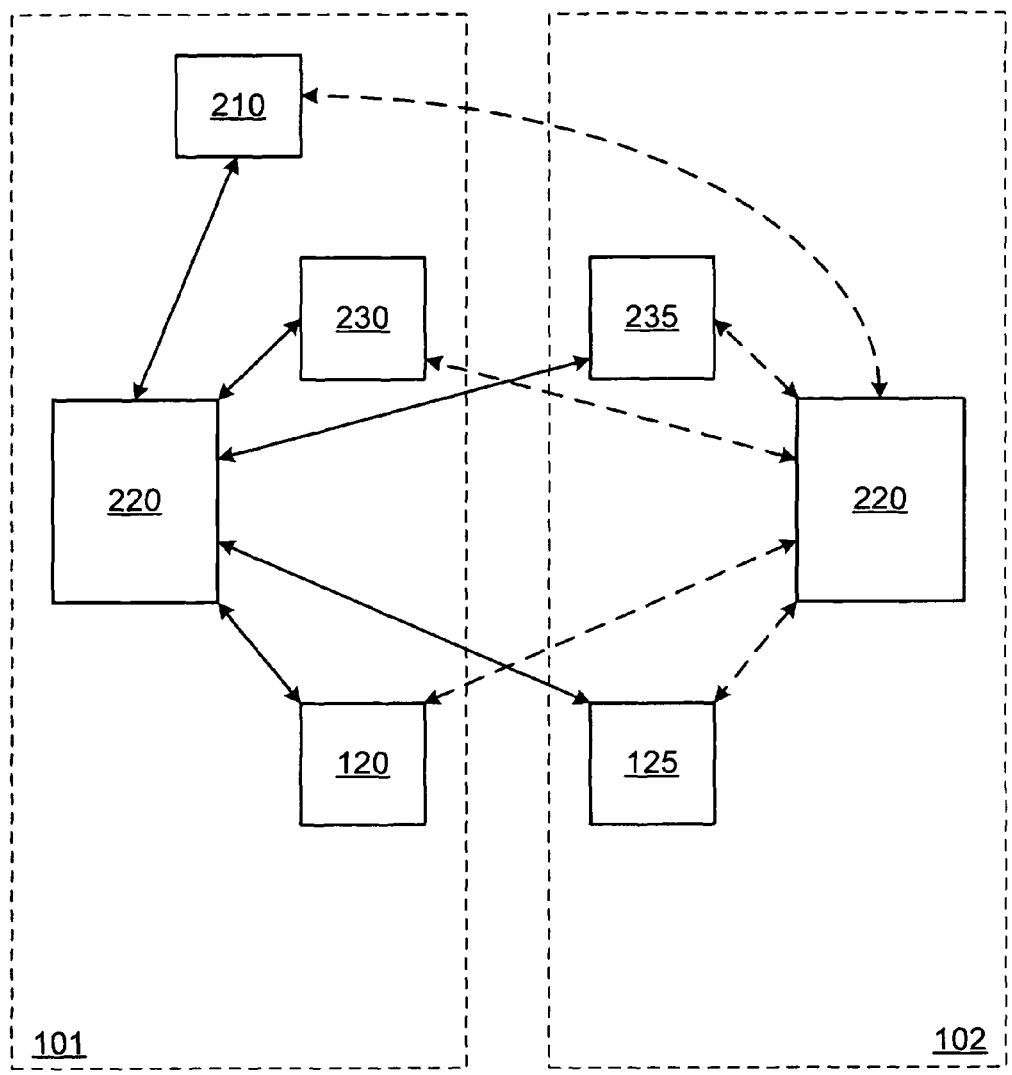
FIG. 2 is a diagram illustrating generation, transmission, and storage of access codes in an embodiment of the present invention.

FIG. 2 is a diagram illustrating generation, transmission, and storage of access codes in an embodiment of the present invention wherein components identical to those shown in FIG. 1 are identified by the same reference number. In FIG. 2, a guest receives an access code after registering at a security front desk of the visited site along with the guest network's SSID and instructions on accessing the guest network. Each security front desk can enter registration information about the guest and request an access code that allows the guest to wirelessly access the internet from locations within the visited site. Registration information is entered into a console 210 that generates the access code for the guest. The console 210 provides an interface to a guest-net application executing on one of a plurality of web and database servers 220 located at the primary data center 101. The access codes generated by the console 210 are pushed to an access-code database 230 for storage. The application also transmits the generated access codes to a secondary access-code database 225 located in the secondary data center. The access codes are pushed to the access manager at both the primary and secondary data centers. In a preferred embodiment, access codes pushed to the access manager use a secure connection such as, for example, SSL. In FIG. 2, redundant paths are shown in dashed lines and mirror the primary paths followed by the access codes. In a backup scenario, console 210 may be provided by a guest-net application executing on one of a plurality of web and database servers 225 located at the secondary data center 102. The generated access codes are pushed to both access-code databases 230 235 and are also pushed to both access managers 120 125 from the secondary web/database server 225.

The guest uses his/her wireless device such as, for example, a laptop or PDA to access the internet through the company's guest network. The wireless device connects to an access point and is routed to the wireless switch. In a preferred embodiment, the access point is a Cisco 1200 series access point and the wireless switch is a Cisco series 6500 wireless switch, both available from Cisco Systems, Inc. of San Jose, Calif. The access point routes the guest wireless traffic to the primary switch by having the primary and secondary switch advertise the same IP address but with a different offset such that the primary switch is favored over the secondary switch. The primary switch forwards the guest wireless traffic to the gateway router through the access manager. The access manager prompts the guest for the access code and compares the entered access code against the access-code database. If the entered access code is authorized to access the internet, the access manager passes the wireless traffic to the gateway router. If the access code is not authorized to access the internet, the wireless traffic is blocked and not sent to the gateway router. In a preferred embodiment, the access manager is a database appliance such as, for example, the building broadband service manager (BBSM) appliance available from Cisco Systems, Inc.

In a preferred embodiment, the gateway router in the primary data center originates a static VRF default route toward the ISP's serial interface IP address. The use of a VRF creates a separate logical routing table so that the wireless default routing does not interfere with the company's employee Internet routing. The primary data center is the preferred datacenter for guest wireless access to the Internet and considered primary. Multi-protocol BGP passes the VRF vendor default to the internal wireless switches. Multi-protocol BGP also logically connects the guest-net inter-datacenter routing domain between the two wireless switches. Because of multi-protocol BGP route propagation, all of the wireless switches in the VRF vendor routing domain learn the VRF vendor default route dynamically.

If the access manager or firewalls fail, the multi-protocol BGP peering between the external primary gateway router and the primary wireless switch breaks thereby removing the dynamically passed VRF vendor default route from the VRF routing domain.

Once the VRF vendor dynamic default disappears, a mechanism has to be in place to make sure that guest traffic destined for the primary wireless switch can traverse the inter-datacenter VRF connection and utilize the backup DMZ without having to fail the entire primary wireless switch over. To accomplish this failover, a "floating" VRF vendor static default route activates the instant the primary dynamic default route disappears, for whatever reason. The floating static default route is characterized by an offset that indicates the prefer ability of this route against other protocols that might also be advertising the route. Both datacenter's wireless switches utilize this type of static route to forward traffic to the backup guest DMZ in the event of dynamic routing failure.

The description herein should be understood to describe only one preferred embodiment of the invention. Those skilled in the art will recognize, for example, that the described embodiment is just one simplified example of the novel system and method for fault tolerant wireless access.

The simplified example is all that needs to be described in detail in order to enable the more general system and method that the invention comprises.

Embodiments of the present invention comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A system comprising:
   a primary route for handling wireless traffic between an internet and an intranet, the primary route including a primary gateway router connected to the internet, a primary switch configured to aggregate and direct wireless traffic on the intranet, and an access manager connected between the primary gateway router and the primary switch, the access manager configured to allow access to the internet to an authorized guest, the primary gateway router, the access manager and primary switch being located at a first data center, the primary gateway router and the primary switch communicating with each other using a protocol that is not configurable on the access manager, the primary route being connected wirelessly to the intranet; and
   a secondary route providing a redundant route between the internet and the intranet, the secondary route including a secondary gateway router connected to the internet and a secondary switch configured to aggregate and direct wireless traffic on the intranet, the secondary gateway router and secondary switch being located at a second data center geographically separate from the first data center,
   wherein the primary switch and secondary switch are on a same subnet, and the primary switch and secondary switch exchange keep-alive messages with each other.

2. The system of claim 1 wherein the primary switch automatically routes the wireless traffic to the secondary switch when communication between the primary gateway router and the primary switch is broken.

3. The system of claim 1 wherein the primary switch advertises an IP address with a first offset and the secondary switch advertises the same IP address with a second offset, the first and second offsets configured to route wireless traffic to the primary switch.

4. A method of providing fault tolerant wireless access to an internet, the method comprising:
   providing a primary switch located at a first data center, the primary switch configured to route wireless traffic to the internet through a first route;
   providing a primary gateway router located at the first data center, the primary gateway router being connected to the interne, the primary gateway router being configured to aggregate and direct wireless traffic on an intranet;
   providing an access manager located at the first data center, the access manager being connected between the primary gateway router and the primary switch, the access manager being configured to allow access to the interne to an authorized guest, the primary gateway router and the primary switch communicating with each other using a protocol that is not configurable on the access manager; and
   providing a secondary switch located at a second data center separate from the first data center, the secondary switch configured to route wireless traffic to the internet through a second route when a break occurs in the first route,
   wherein the primary switch and secondary switch are on a same subnet, and the primary switch and secondary switch exchange keep-alive messages with each other.

5. A method of wirelessly accessing an internet at a site, the method comprising:
   receiving an access code;
   connecting to a wireless network using the access code, the wireless network connected to the internet; and
   transmitting messages to the internet, the messages routed through a primary wireless switch, a primary gateway router and an access manager located at a primary data center, the primary wireless switch routing the messages to the internet along a primary route, the access manager configured to allow access to the internet to an authorized guest, the primary gateway router and the primary switch communicating with each other using a protocol that is not configurable on the access manager,
   wherein a secondary wireless switch located at a secondary data center separate from the first data center automatically routes the messages through a secondary route when a break occurs in the primary route, and
   wherein the primary wireless switch and secondary wireless switch are on a same subnet, and the primary switch and secondary switch exchange keep-alive messages with each other.

6. A system comprising:
   a primary switch configured to aggregate and direct wireless traffic on a network and to advertise an IP address with a first offset;
   a primary gateway router located at the first data center, the primary gateway router being connected to the internet, the primary gateway router being configured to aggregate and direct wireless traffic on an intranet;
   an access manager located at the first data center, the access manager being connected between the primary gateway router and the primary switch, the access manager being configured to allow access to the internet to an authorized guest, the primary gateway router and the primary switch communicating with each other using a protocol that is not configurable on the access manager;
   a secondary switch configured to route wireless traffic through a redundant route over the network and to advertise the same IP address with a second offset, the first and second offsets routing wireless traffic to the primary switch; and
   a redundancy subnet for exchanging keep-alive messages between the primary and secondary switches,
   wherein if the primary switch fails to communicate the keep-alive messages over the redundancy subnet to the secondary switch, the secondary switch routes the wireless traffic over the redundant route of the network.

7. The system of claim 6, wherein the primary switch automatically routes the wireless traffic to the secondary switch when there is no communication between a primary gateway router and the primary switch.

8. A method comprising:

providing a primary switch to route wireless traffic on a network and to advertise an IP address with a first offset;

providing a primary gateway router located at the first data center, the primary gateway router being connected to the interne, the primary gateway router being configured to aggregate and direct wireless traffic on an intranet;

providing an access manager located at the first data center, the access manager being connected between the primary gateway router and the primary switch, the access manager being configured to allow access to the internet to an authorized guest, the primary gateway router and the primary switch communicating with each other using a protocol that is not configurable on the access manager, providing a secondary switch to route wireless traffic through a redundant route over the network and to advertise the same IP address with a second offset; and routing wireless traffic to the primary switch using the first and second offsets;

wherein the primary switch and the secondary switch exchange keep-alive messages with each other over a redundancy subnet, and if the primary switch fails to communicate the keep-alive messages over the redundancy subnet to the secondary switch, routing the wireless traffic, via the secondary switch, over the redundant route of the network.

9. The method of claim 8 further comprising the step of routing the wireless traffic, via the primary switch, to the second switch when there is no communication between a primary gateway router and the primary switch.

* * * * *